(12) United States Patent
Mercier

(10) Patent No.: US 10,299,325 B2
(45) Date of Patent: May 21, 2019

(54) OPTOELECTRONIC CIRCUIT WITH LIGHT-EMITTING DIODES

(71) Applicant: Aledia, Grenoble (FR)

(72) Inventor: Frédéric Mercier, Saint Nicolas de Macherin (FR)

(73) Assignee: Aledia, Grenoble (FR)

( * ) Notice: Subject to any disclaimer, the term of this patent is extended or adjusted under 35 U.S.C. 154(b) by 0 days.

(21) Appl. No.: 15/750,171

(22) PCT Filed: Jul. 19, 2016

(86) PCT No.: PCT/FR2016/051842
§ 371 (c)(1),
(2) Date: Feb. 2, 2018

(87) PCT Pub. No.: WO2017/021609
PCT Pub. Date: Feb. 9, 2017

(65) Prior Publication Data
US 2018/0242416 A1    Aug. 23, 2018

(30) Foreign Application Priority Data
Aug. 3, 2015  (FR) .................................... 15 57478

(51) Int. Cl.
*H05B 1/00* (2006.01)
*H05B 37/02* (2006.01)
*H05B 33/08* (2006.01)

(52) U.S. Cl.
CPC ..... *H05B 33/0824* (2013.01); *H05B 33/0809* (2013.01); *Y02B 20/342* (2013.01)

(58) Field of Classification Search
CPC ...... H05B 41/042; H05B 41/10; H05B 41/18; H05B 41/19; H05B 33/0815; H05B 33/0818; H05B 41/2828; H05B 41/3921; H05B 41/3927; H05B 37/029; H05B 33/0803; H05B 37/0254; H05B 37/02; Y02B 20/204
See application file for complete search history.

(56) References Cited

U.S. PATENT DOCUMENTS

| 2010/0315148 A1 | 12/2010 | Zhu et al. |
| 2011/0273102 A1 | 11/2011 | van de Ven et al. |
| 2012/0038285 A1 | 2/2012 | Leung et al. |
| 2014/0139125 A1 | 5/2014 | Lee |

(Continued)

FOREIGN PATENT DOCUMENTS

WO    WO 2013/100736 A1    7/2013

OTHER PUBLICATIONS

Written Opinion for Application No. PCT/FR2016/051842 dated Oct. 25, 2016.

*Primary Examiner* — Minh D A
(74) *Attorney, Agent, or Firm* — Wolf, Greenfield & Sacks, P.C.

(57) ABSTRACT

An optoelectronic circuit for receiving a variable voltage containing alternating increasing and decreasing phases, the optoelectronic circuit including a plurality of assemblies of light-emitting diodes and a switching device for controlling or interrupting the circulation of a current in each assembly and for varying the intensity of the current according to the number of assemblies through which the current passes during at least one increasing or decreasing phase.

14 Claims, 9 Drawing Sheets

(56) References Cited

U.S. PATENT DOCUMENTS

| | | | |
|---|---|---|---|
| 2015/0054408 A1* | 2/2015 | Wlodarczyk | H05B 33/0809 315/137 |
| 2015/0061499 A1* | 3/2015 | Hattrup | H05B 33/0815 315/122 |
| 2015/0181666 A1* | 6/2015 | Muesch | H05B 33/083 315/185 R |
| 2015/0214976 A1 | 7/2015 | De Marco et al. | |

* cited by examiner

OPTOELECTRONIC CIRCUIT WITH LIGHT-EMITTING DIODES

CROSS-REFERENCE TO RELATED APPLICATIONS

This application is the national phase of International Application No. PCT/FR2016/051842, filed Jul. 19, 2016, which claims priority to French Patent Application number 15/57478, filed Aug. 3, 2015, both of which applications are incorporated herein by reference to the maximum extent allowable.

BACKGROUND

The present description relates to an optoelectronic circuit, particularly to an optoelectronic circuit comprising light-emitting diodes.

DISCUSSION OF THE RELATED ART

It is desirable to be able to power an optoelectronic circuit comprising light-emitting diodes with an AC voltage, particularly a sinusoidal voltage, for example, the mains voltage.

FIG. 1 shows an example of an optoelectronic circuit 10 comprising input terminals $IN_1$ and $IN_2$ having an AC voltage $V_{IN}$ applied therebetween. Optoelectronic circuit 10 further comprises a rectifying circuit 12 comprising a diode bridge 14, receiving voltage $V_{IN}$ and supplying a rectified voltage $V_{ALIM}$ which powers light-emitting diodes 16, for example, series-assembled with a resistor 15. Call $I_{ALIM}$ the current flowing through light-emitting diodes 16.

FIG. 2 is a timing diagram of power supply voltage $V_{ALIM}$ and of power supply current $I_{ALIM}$ for an example where AC voltage $V_{IN}$ corresponds to a sinusoidal voltage. When voltage $V_{ALIM}$ is greater than the sum of the threshold voltages of light-emitting diodes 16, light-emitting diodes 16 become conductive. Power supply current $I_{ALIM}$ then follows power supply voltage $V_{ALIM}$. There thus is an alternation of phases OFF without light emission and of light-emission phases ON.

A disadvantage is that as long as voltage $V_{ALIM}$ is smaller than the sum of the threshold voltages of light-emitting diodes 16, no light is emitted by optoelectronic circuit 10. An observer may perceive this lack of light emission when the duration of each OFF phase between two ON phases is too long. A possibility, to increase the duration of each ON phase, is to decrease the number of light-emitting diodes 16. A disadvantage then is that a significant amount of electric power is lost in resistor 15.

There exist optoelectronic circuits comprising a light-emitting diode switching circuit capable of progressively increasing the number of light-emitting diodes receiving power supply voltage $V_{ALIM}$ during a rising phase of power supply voltage $V_{ALIM}$ and of progressively decreasing the number of light-emitting diodes receiving power supply voltage $V_{ALIM}$ during a falling phase of power supply voltage $V_{ALIM}$. This enables to decrease the duration of each OFF phase with no light emission.

Publication US 2012/0056559 describes an example of such an optoelectronic circuit. A disadvantage of the optoelectronic circuit described in publication US 2012/0056559 is that the power supply current of the light-emitting diodes does not continuously vary, that is, there are abrupt interruptions of the current during the variation of the power supply voltage. This causes time variations of the light intensity supplied by the light-emitting diodes, which may be perceived by an observer. This further causes a degradation of the harmonic factor of the current powering the light-emitting diodes of the optoelectronic circuit.

A current-limiting circuit may be interposed between the rectifying circuit and the light-emitting diodes to maintain the power supply current of the light-emitting diodes at a substantially constant level. The structure of the optoelectronic circuit may then be relatively complex and the bulk of the optoelectronic circuit may be significant. Further, it may be difficult to at least partly form the rectifying circuit and the current-limiting circuit in integrated fashion with the light-emitting diodes in order to still further decrease the bulk of the optoelectronic circuit. Further, the fact of maintaining the power supply current at a constant level causes a degradation of the power factor of the optoelectronic circuit comprising light-emitting diodes.

SUMMARY

An object of an embodiment is to overcome all or part of the disadvantages of optoelectronic circuits comprising light-emitting diodes comprising a device for switching the previously-described light-emitting diodes.

Another object is to increase the power factor of the optoelectronic circuit.

Another object of an embodiment is to decrease the duration of phases during which no light is emitted by the optoelectronic circuit.

Another object of an embodiment is for the current powering the light-emitting diodes to exhibit no abrupt interruptions.

Another object of an embodiment is to decrease the bulk of the optoelectronic circuit.

Thus, an embodiment provides an optoelectronic circuit intended to receive a variable voltage containing an alternation of rising and falling phases, the optoelectronic circuit comprising:

a plurality of assemblies of light-emitting diodes; and a switching device capable of ordering or of interrupting the flowing of a current in each assembly and capable of varying the intensity of said current according to the number of assemblies conducting said current during at least one rising or falling phase.

According to an embodiment, the optoelectronic circuit comprises a current source capable of supplying said current having its intensity depending on at least one control signal, the switching device being capable of ordering or of interrupting the flowing of said current through each assembly and capable of supplying said at least one control signal to vary the intensity of said current according to the number of assemblies conducting said current during at least one rising or falling phase.

According to an embodiment, the current source is capable of supplying a current having its intensity varying among a plurality of different intensity values according to the number of assemblies conducting said current during at least one rising or falling phase.

According to an embodiment, the current source comprises elementary current sources assembled in parallel and capable of being activated and deactivated independently from one another.

According to an embodiment, the elementary current sources are capable of supplying currents having the same intensity or different intensities.

According to an embodiment, the switching device is capable of activating at least one of the elementary current sources during at least one rising phase and is capable of deactivating at least one of the elementary current sources during at least one falling phase.

According to an embodiment, one of the elementary current sources is capable of supplying a current having a given intensity and the other elementary current sources are capable of each supplying a current having an intensity equal to a power of two different from said given intensity.

According to an embodiment, the switching device is capable of connecting the assemblies of light-emitting diodes according to a plurality of connection configurations successively according to a first order during each rising phase of the variable voltage and a second order during each falling phase of the variable voltage and is capable of activating the elementary current sources according to a third order during each rising phase of the variable voltage and of deactivating the elementary current sources according to a fourth order during each rising phase of the variable voltage.

According to an embodiment, the optoelectronic circuit comprises a memory having a plurality of values of the control signal of the current source, each corresponding to the provision by the current source of a current having its intensity varying among said plurality of intensity values, stored therein.

According to an embodiment, the optoelectronic circuit comprises means for modifying the variation profile of the intensity of said current according to the number of assemblies conducting said current during at least one rising or falling phase.

According to an embodiment, the assemblies of light-emitting diodes are series-connected and the switching device comprises, for each assembly of light-emitting diodes, at least one switch connecting said assembly to the current source, the switching device being capable of transmitting binary control signals to turn the switches off or on according to said connection configurations.

An embodiment also provides a method of controlling a plurality of assemblies of light-emitting diodes of an optoelectronic circuit receiving a variable voltage containing an alternation of rising and falling phases, the optoelectronic circuit further comprising a current source supplying a current having its intensity depending on at least one control signal and a switching device. During at least one rising or falling phase, the switching device orders or interrupts the flowing of said current in each assembly and delivers said at least one control signal to vary the intensity of said current according to the number of assemblies conducting said current.

According to an embodiment, the current source supplies a current having its intensity varying among a plurality of different intensity values according to the number of assemblies conducting said current during at least one rising or falling phase.

According to an embodiment, the current source comprises at least two elementary current sources assembled in parallel and at least one of the elementary current sources is activated during at least one rising phase and at least one of the elementary current sources is deactivated during at least one falling phase.

According to an embodiment, the current source comprises at least three elementary current sources assembled in parallel. For at least successive rising and falling phases, the number of activated elementary current sources increases from the beginning to the end of the rising phase and the number of activated elementary current sources decreases from the beginning to the end of the falling phase or the number of activated elementary current sources increases and then decreases from the beginning to the end of the rising phase and the number of activated elementary current sources increases and then decreases from the beginning to the end of the falling phase.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
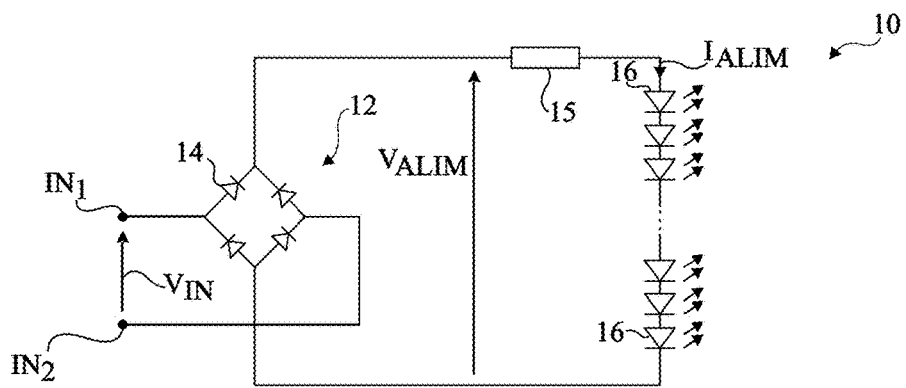
FIG. 1, previously described, is an electric diagram of an example of an optoelectronic circuit comprising light-emitting diodes.
Figure 2:
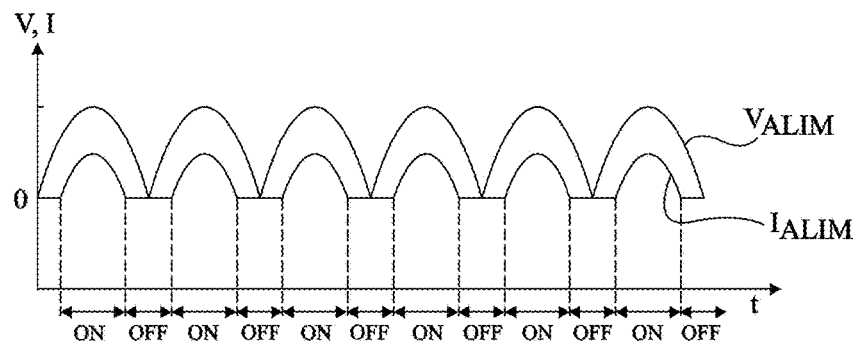
FIG. 2, previously described, is a timing diagram of the power supply voltage and current of the light-emitting diodes of the optoelectronic circuit of FIG. 1.

For clarity, the same elements have been designated with the same reference numerals in the various drawings and, further, the various drawings are not to scale. In the following description, unless otherwise indicated, terms "substantially", "approximately", and "in the order of" mean "to within 10%". In the following description, the ratio of the active power consumed by the electronic circuit to the product of the effective values of the current and of the voltage powering the electronic circuit is called "power factor".

Figure 3:
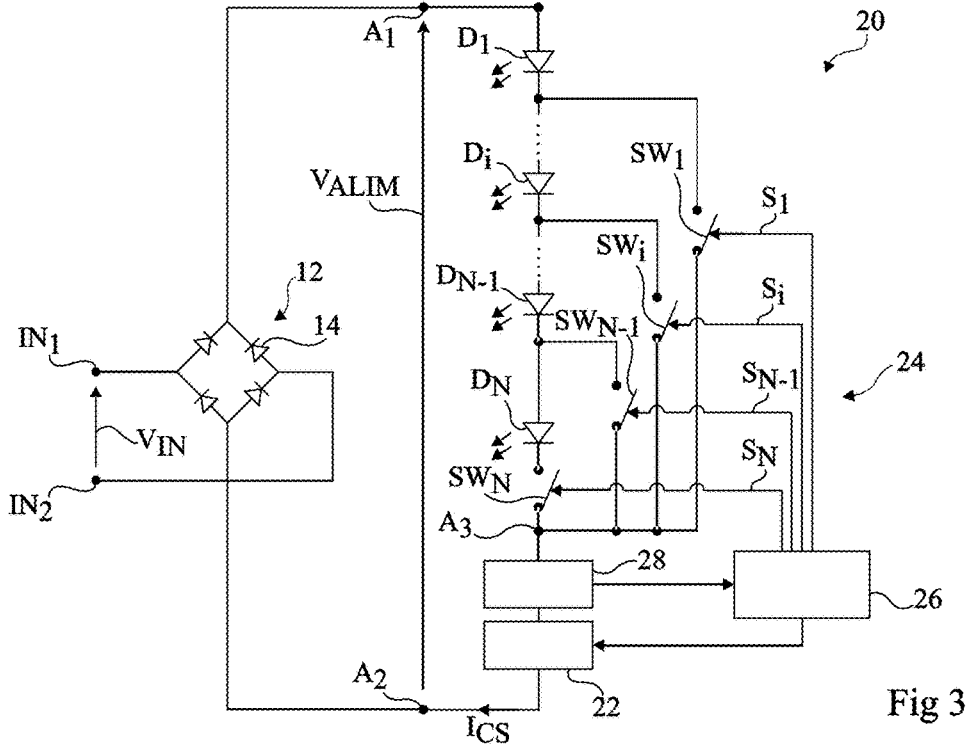
FIG. 3 shows an electric diagram of an embodiment of an optoelectronic circuit comprising light-emitting diodes and a device for switching the light-emitting diodes.

FIG. 3 shows an electric diagram of an embodiment of an optoelectronic circuit 20 comprising a light-emitting diode switching device. The elements of optoelectronic circuit 20 common with optoelectronic circuit 10 are designated with the same reference numerals. In particular, optoelectronic circuit 20 comprises rectifying circuit 12 receiving power supply voltage $V_{IN}$ between terminals $IN_1$ and $IN_2$ and supplying rectified voltage $V_{ALIM}$ between nodes $A_1$ and $A_2$. As a variation, circuit 20 may directly receive a rectified voltage, and it is then possible for the rectifying circuit not to be present.

Optoelectronic circuit 20 comprises N series-connected assemblies of elementary light-emitting diodes, called general light-emitting diodes $D_i$ in the following description, where i is an integer in the range from 1 to N and where N is an integer in the range from 2 to 200. Each general light-emitting diode $D_1$ to $D_N$ comprises at least one elementary light-emitting diode and is preferably formed of the series and/or parallel assembly of at least two elementary light-emitting diodes. In the present example, the N general light-emitting diodes $D_i$ are series-connected, the cathode of general light-emitting diode $D_i$ being coupled to the anode of general light-emitting diode $D_{i+1}$, for i varying from 1 to N−1. The anode of general light-emitting diode $D_1$ is coupled to node $A_1$. General light-emitting diodes $D_i$, with i varying from 1 to N, may comprise the same number of elementary light-emitting diodes or different numbers of elementary light-emitting diodes.

Optoelectronic circuit 20 comprises a current source 22 having a terminal coupled to node $A_2$ and having its other terminal coupled to a node $A_3$. Call $I_{CS}$ the current flowing between nodes $A_1$ and $A_2$. Circuit 20 comprises a device 24 for switching general light-emitting diodes $D_i$, with i varying from 1 to N. As an example, device 24 comprises N controllable switches $SW_1$ to $SW_N$. Each switch $SW_i$, with i varying from 1 to N, is assembled between node $A_3$ and the cathode of general light-emitting diode $D_i$. Each switch $SW_i$, with i varying from 1 to N, is controlled by a signal $S_i$ supplied by a control unit 26. Current source 22 is also controlled by control unit 26. Control unit 26 may be totally or partly formed by a dedicated circuit or may comprise a microprocessor or a microcontroller capable of executing a series of instructions stored in a memory. As an example, signal $S_i$ is a binary signal and switch $SW_i$ is off when signal $S_i$ is in a first state, for example, the low state, and switch $SW_i$ is on when signal $S_i$ is in a second state, for example, the high state.

Each switch $SW_i$ is, for example, a switch comprising at least one transistor, particularly a field-effect metal-oxide gate transistor or enrichment (normally on) or depletion (normally off) MOS transistor. According to an embodiment, each switch $SW_i$ comprises a MOS transistor, for example, having an N channel, having its drain coupled to the cathode of general light-emitting diode $D_i$, having its source coupled to node $A_3$, and having its gate receiving signal $S_i$.

Optoelectronic circuit 20 comprises one or a plurality of sensors connected to control unit 26. It may be a single sensor, for example, a sensor capable of measuring voltage $V_{ALIM}$ or the current flowing between terminals $IN_1$ and $IN_2$, or a plurality of sensors, where each sensor may be associated with a general light-emitting diode $D_i$. As an example, a single sensor 28 has been shown in FIG. 3.

Control unit 26 is capable of controlling switches $SW_i$, with i varying from 1 to N, to the on or off state according to the value of voltage $V_{ALIM}$ according to a sequence based on the measurement of a physical parameter, for example, at least a current or a voltage. As an example, the turning off and the turning on of switches $SW_i$ may be controlled by control unit 26 based on the signals supplied by sensor 28 or the sensors. As a variation, the turning off and the turning on of switch $SW_i$ may be controlled based on the measurement of the voltage at the cathode of each general light-emitting diode $D_i$. The number of switches $SW_1$ to $SW_N$ may vary according to the turn-off and turn-on sequence implemented by control unit 26. As an example, switch $SW_N$ may not be present.

Current source 22 is a current source controlled by control unit 26 and capable of supplying a current $I_{CS}$ which remains uninterrupted as long as power supply voltage $V_{ALIM}$ is greater than the threshold voltage of general light-emitting diode $D_1$. Current source 22 is capable of supplying a variable current at different levels according to the number of general light-emitting diodes which are conductive. Preferably, current source 22 supplies a current $I_{CS}$ having its intensity increasing when the number of general light-emitting diodes which are conductive increases. This advantageously enables to increase the power factor of optoelectronic circuit 20 with respect to the case where the current would be constant. Optoelectronic circuit 20 may comprise a circuit, not shown, for supplying a reference voltage, possibly obtained from voltage $V_{ALIM}$ for the supply of the current source.

Figure 4:
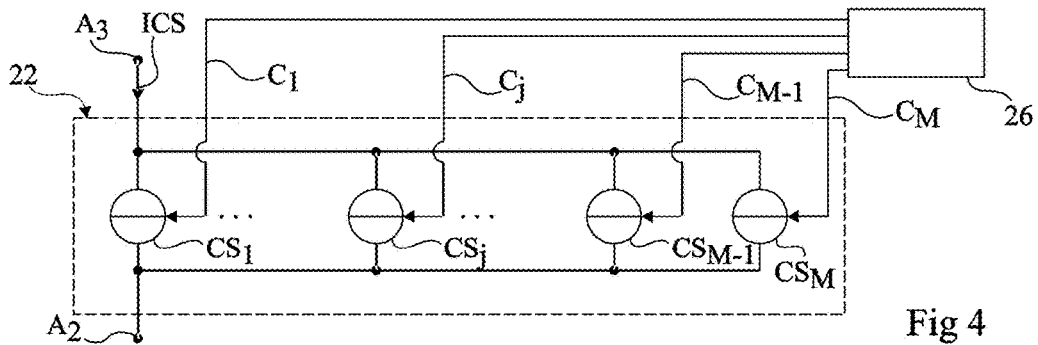
FIG. 4 shows an electric diagram of an embodiment of the current source of the optoelectronic circuit of FIG. 3.

FIG. 4 shows an embodiment of current source 22 where current source 22 comprises M elementary controllable current sources $CS_1$ to $CS_M$, M being an integer capable of varying from 1 to N. Preferably, M is equal to N. In the present embodiment, elementary current sources $CS_j$, with j varying from 1 to M, are assembled in parallel between node $A_3$ and node $A_2$. Each elementary current source $CS_j$ is activated or deactivated by control unit 26 by means of a control signal $C_j$. As an example, signal $C_j$ is a binary signal and elementary current source $CS_j$ is off when signal $C_j$ is in a first state, for example, the low state, and current source $CS_j$ is activated when signal $C_j$ is in a second state, for example, the high state. As a variation, signal $C_1$ may be omitted and current source $CS_1$ may be automatically activated, that is, it supplies a current as soon as it is powered with a sufficient voltage.

The larger the number of current sources $CS_j$ which are activated, the higher the intensity of current $I_{CS}$. According to an embodiment, the number of elementary current sources $CS_j$ which are activated depends on the number of general light-emitting diodes $D_i$ which are conductive. According to an embodiment, current source 22 is capable of supplying a current $I_{CS}$ having an intensity at a level among a plurality of constant levels and having its level depending on the number of general light-emitting diodes which are conductive. The currents supplied by elementary current sources $CS_j$ of current source 22 may be identical or different. According to an embodiment, each elementary current source $CS_j$ is capable of supplying a current of intensity $I*2^{j-1}$. Current source 22 is then adapted to supply a current having an intensity $I_{CS}$ which may, according to control signals $C_j$, take any value $k*I$, with k varying from 0 to $2^M-1$.

The sequence of activation of current sources $CS_j$ during the variation of voltage $V_{ALIM}$ particularly depends on the operating properties of the optoelectronic circuit which are desired to be favored.

Figure 5A:
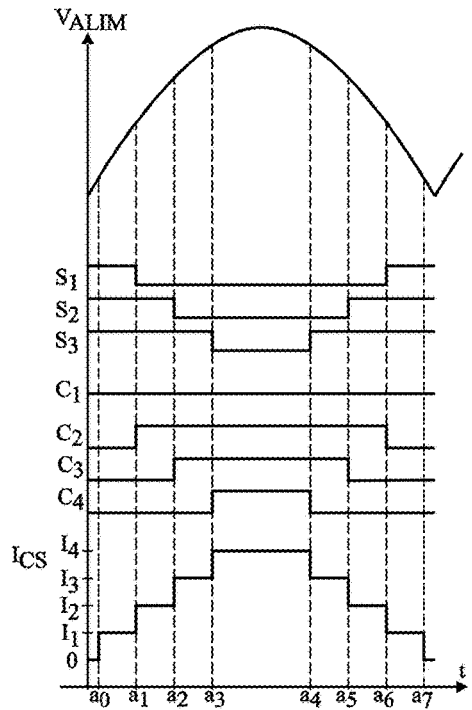
FIGS. 5A and 5B are timing diagrams of voltages and of currents of the optoelectronic circuit of FIG. 3 for two embodiments of control of the current source of the optoelectronic circuit.

FIG. 5A illustrates an embodiment of a sequence of activation of the current sources which enables to increase the power factor of the optoelectronic circuit. FIG. 5A shows curves of the variation of signals $S_1$, $S_2$ and $S_3$, curves of the variations of signals $C_1$, $C_2$, $C_3$ and $C_4$, and of current $I_{CS}$ when optoelectronic circuit 20 comprises four general light-emitting diodes and four elementary current sources $CS_j$ in parallel, during a cycle of voltage $V_{ALIM}$ in the case where voltage $V_{IN}$ is a sinusoidal voltage. Call $a_0$ to $a_7$ successive times and $I_1$, $I_2$, $I_3$ and $I_4$ increasing intensity values of current $I_{CS}$.

According to an embodiment, at the beginning of a rising phase of voltage $V_{ALIM}$, signals $S_i$, with i varying from 1 to N−1, are initially at "1" so that switches $SW_i$ are on. Signal $C_1$ is at "1" so that current source $CS_1$ is activated. At time $a_0$, general light-emitting diode $D_1$ turns on and conducts current $I_{CS}$ having an intensity equal to $I_1$. Switches $SW_1$, $SW_2$, and $SW_3$ are successively turned off at times $a_1$, $a_2$, and $a_3$ along the rise of voltage $V_{ALIM}$ so that general light-emitting diodes $D_2$, $D_3$, and $D_4$ are successively powered with current. In parallel, current sources $CS_2$, $CS_3$ and $CS_4$ are successively activated at times $a_1$, $a_2$ and $a_3$ along the rise of voltage $V_{ALIM}$, so that the intensity of power supply current $I_{CS}$ is successively equal to $I_2$, $I_3$ and $I_4$. During a falling phase of voltage $V_{ALIM}$, switches $SW_3$, $SW_2$, and $SW_1$ are successively turned on at times $a_4$, $a_5$, and $a_6$ to successively short-circuit general light-emitting diodes $D_4$, $D_3$, and $D_2$. In parallel, during a falling phase of voltage $V_{ALIM}$, current sources $CS_4$, $CS_3$ and $CS_2$ are successively deactivated at times $a_4$, $a_5$, and $a_6$ so that the intensity of power supply current $I_{CS}$ is successively equal to $I_3$, $I_2$ and $I_1$. At time $a_7$, when the power supply voltage becomes smaller than the threshold voltage of general light-emitting diode $D_1$, current $I_{CS}$ takes a zero value.

In this embodiment, the current sources are activated so that power supply current $I_{CS}$ follows as best as possible the general shape of a sine wave, that is, the shape of voltage $V_{ALIM}$, in phase therewith. Advantageously, the power factor of the optoelectronic circuit is then increased.

Figure 5B:
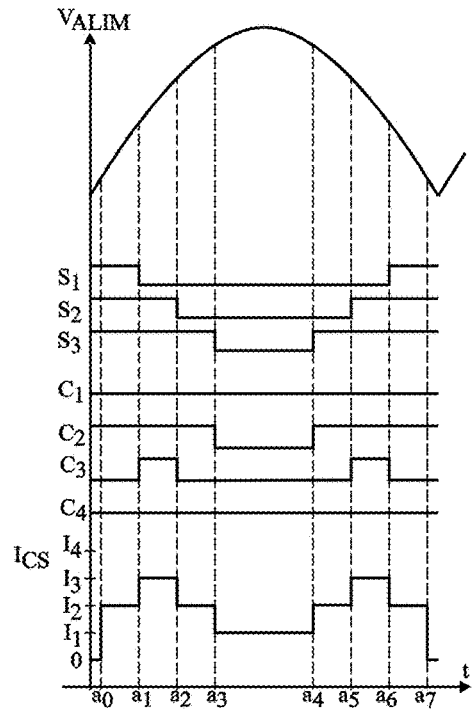

FIG. 5B is similar to FIG. 5A and illustrates an embodiment of a sequence of activation of the current sources, which enables to decrease the flickering perceived by an observer. The curves of FIG. 5B have been obtained with the optoelectronic circuit used to obtain the curves of FIG. 5A, with the difference that the current source activation sequence is modified. Indeed, signals $C_1$ and $C_2$ are initially at "1" and signals $C_3$ and $C_4$ are initially at "0" so that current sources $CS_1$ and $CS_2$ are activated and, at time $a_0$, the intensity of current $I_{CS}$ flowing through general light-emitting diode $D_1$ is equal to $I_2$. At time $a_1$, signal $C_3$ is set to "1" so that the intensity of current $I_{CS}$ flowing through general light-emitting diodes $D_1$ and $D_2$ is equal to $I_3$. At time $a_2$, signal $C_3$ is set to "0" so that the intensity of current $I_{CS}$ flowing through general light-emitting diodes $D_1$, $D_2$ and $D_3$ is equal to $I_2$. At time $a_3$, signal $C2$ is set to "0" so that the intensity of current $I_{CS}$ flowing through general light-emitting diodes $D_1$, $D_2$, $D_3$ and $D_4$ is equal to $I_1$. A symmetrical activation sequence is carried out at times $a_4$, $a_5$, $a_6$ and $a_7$. The intensity of the current is controlled so that the emission light power of the optoelectronic circuit is close to the average light power emitted over a halfwave of voltage $V_{ALIM}$. The variations of the light power perceived by the observed are then decreased.

According to an embodiment, the values of control signals $C_j$ may be stored in a memory of control unit 26 for each switching configuration of the switches.

According to another embodiment, the control of current source 22 by control unit 26 may be modified during the operation of the optoelectronic circuit, for example, according to whether it is desirable to increase the power factor of the optoelectronic circuit or to decrease the flickering perceived by an observer. In the case where current source 22 comprises elementary current sources $CS_j$, this means that the sequence of activation of elementary current sources $CS_j$ may be modified during the operation of the optoelectronic circuit. As an example, the optoelectronic circuit may be made in the form of an integrated circuit comprising a dedicated pin having a control signal of control unit 26 representative of the desired control of current source 22 applied thereto. According to another example, control unit 26 comprises a memory programmable by a user, having data used by control unit 26 for the desired control of current source 22 by control unit 26 stored therein.

Figure 6:
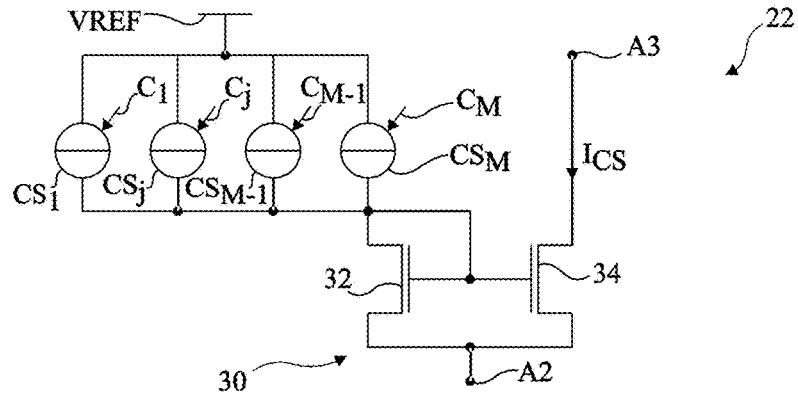
FIGS. 6 to 10 show other embodiments of the current source of the optoelectronic circuit of FIG. 3.

FIG. 6 shows an electric diagram of another embodiment of current source 22. In the present embodiment, current source 22 comprises a current mirror 30. Current mirror 30 comprises two MOS transistors 32 and 34, for example, having an N channel. The sources of MOS transistors 32 and 34 are connected to node $A_2$. Transistor 32 is diode-assembled. The gate of MOS transistor 32 is connected to the drain of MOS transistor 32 and to the gate of MOS transistor 34. The drain of MOS transistor 34 is connected to node $A_3$. Current source 22 further comprises current sources $CS_1$ to $CS_M$ which are assembled in parallel between a source of a reference potential VREF and the drain of transistor 32. Reference potential VREF may be supplied from voltage $V_{ALIM}$. It may be constant or vary according to voltage $V_{ALIM}$. As a variation, MOS transistor 34 may be duplicated for each switch $SW_i$, with i varying from 1 to N.

Figure 7:
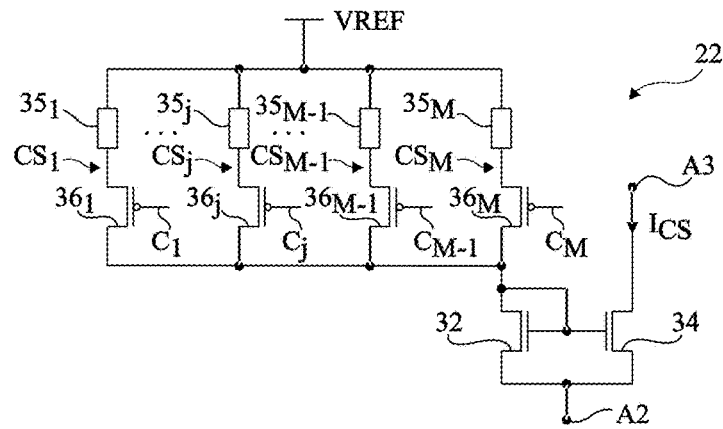

FIG. 7 shows an electric diagram of another embodiment of current source 22 where current source 22 comprises the same elements as the embodiment shown in FIG. 6 and where each current source $CS_j$, with j varying from 1 to M, comprises a resistor $35_j$ series-assembled with a MOS transistor $36_j$, for example, with a P channel, between the source of reference potential VREF and the drain of transistor 32. The gate of each transistor $36_j$ receives control signal $C_j$ or an image of this signal. According to an embodiment, MOS transistor $36_j$ operates in saturated state and acts as a current source. The current supplied by current source $CS_j$ is then defined by the ratio of the potential difference across resistor $35_j$ to the value of resistance $35_j$. According to an embodiment, each transistor $36_j$ is located on the side of transistor 32 while each resistor $35_j$ is located on the side of the source of reference potential VREF.

Figure 8:
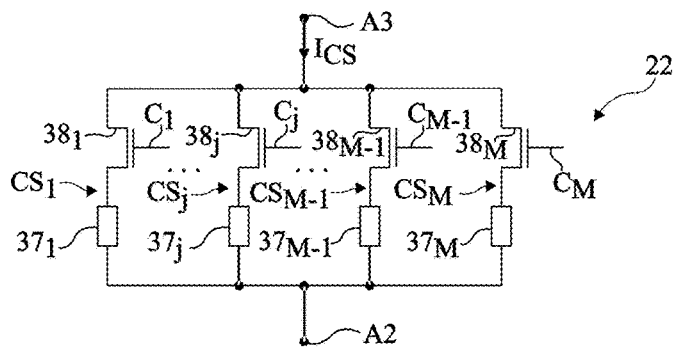

FIG. 8 shows an electric diagram of another embodiment of current source 22 where current source 22 comprises the same elements as the embodiment shown in FIG. 4 and where each current source $CS_j$, with j varying from 1 to M, comprises a resistor $37_j$ series-assembled with a MOS transistor $38_j$, for example, having an N channel, between node A3 and node A2. The gate of each transistor $38_j$ receives control signal $C_j$ or an image of this signal. According to an embodiment, MOS transistor $38_j$ operates in saturated state and acts as a current source. The current supplied by current source $CS_j$ is then defined by the ratio of the potential difference across resistor $37_j$ to the value of resistance $37_j$. According to an embodiment, each transistor $38_j$ is located on the side of node A3 while each resistor $37_j$ is preferably located on the side of node A2.

Figure 9:
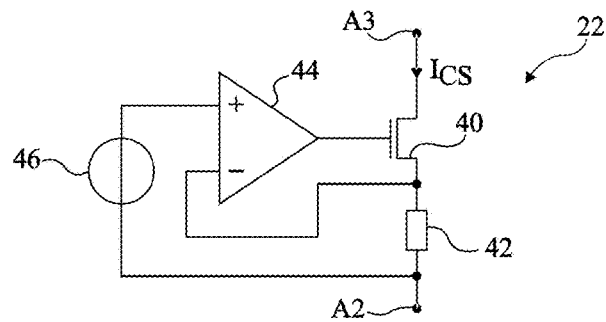

FIG. 9 shows an electric diagram of another embodiment of current source 22 where current source 22 comprises a MOS transistor 40, for example, with an N channel, having its drain connected to node A3 and having its source connected to a terminal of a resistor 42, the other terminal of resistor 42 being connected to node A2. Current source 22 comprises an operational amplifier 44 having its non-inverting input (+) connected to a terminal of a voltage source 46 controlled by control unit 26 and having its inverting input (−) connected to the junction point of transistor 40 and of resistor 42. The other terminal of voltage source 46 is connected to node A2. The output of operational amplifier 44 is connected to the gate of transistor 40. Voltage source 46 may be controlled by control unit 26.

Figure 10:
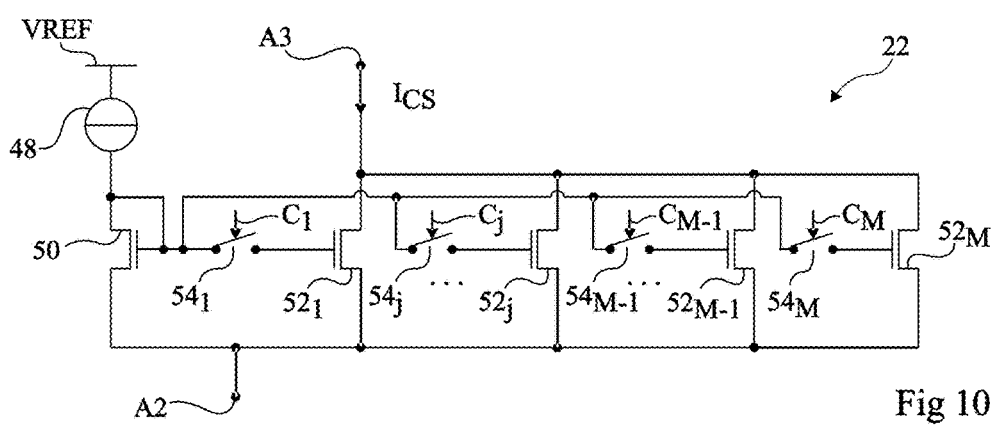

FIG. 10 shows an electric diagram of another embodiment of current source 22 where current source 22 comprises a current source 48 having a terminal connected to the source of reference potential VREF. The other terminal of current source 48 is connected to the drain of a diode-assembled MOS transistor 50, for example, having an N channel. The source of MOS transistor 50 is connected to node $A_2$. The gate of MOS transistor 50 is connected to the drain of MOS transistor 50. Current source 22 further comprises M MOS transistors $52_j$, with j varying from 1 to M, for example, having an N channel. The source of each transistor $52_j$ is connected to node A2. The drain of each transistor $52_j$ is connected to node A3. The gate of each transistor $52_j$ is connected to the gate of transistor 50 via a switch $54_j$. Each switch $52_j$ is controlled by control signal $C_j$ supplied by control unit 16. As a variation, switch $54_1$ may be omitted. Each transistor $52_j$ forms a current mirror with transistor 50. The intensity of current $I_{CS}$ depends on the number of switches $54_j$ which are on. According to an embodiment, each transistor $52_j$ is identical to transistor 50. When switch $54_j$ is on, transistor $52_j$ conducts a current having the same intensity as the current supplied by current source 48 and is equivalent to elementary current source $CS_j$. According to another embodiment, the dimensions of transistors $52_j$ may be different from those of transistor 50 and may be different between transistors $52_j$ so that the intensity of the current flowing through each transistor $52_j$, when the associated switch $54_j$ is on, is different from the intensity of the current supplied by current source 48.

Figure 11:
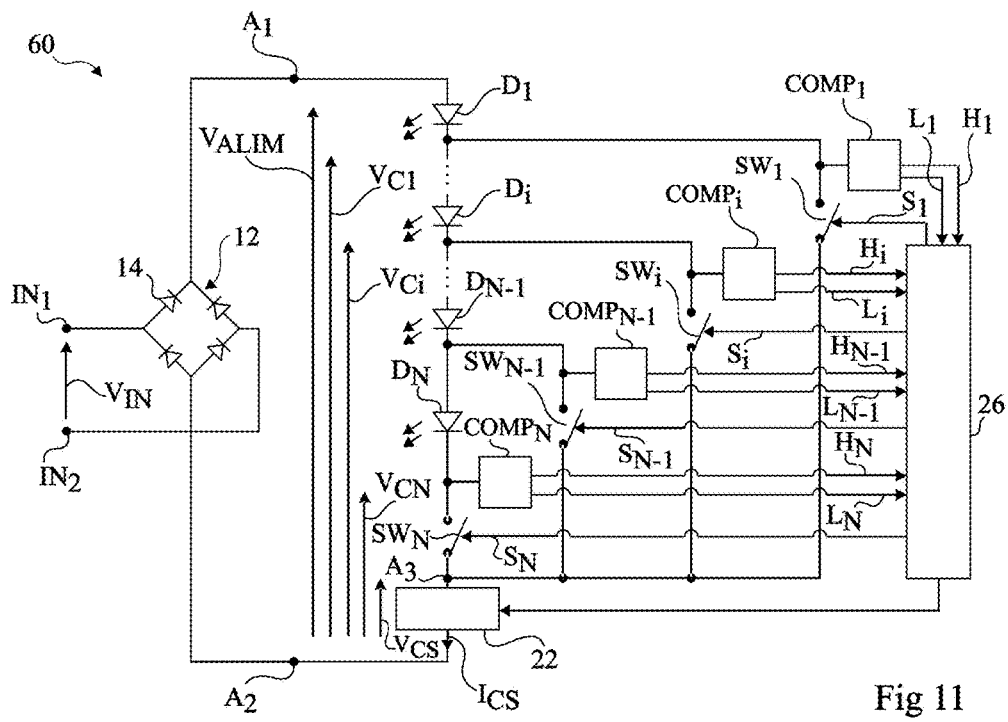
FIG. 11 is an electric diagram of another embodiment of an optoelectronic circuit comprising light-emitting diodes and a device for switching the light-emitting diodes.

FIG. 11 shows a more detailed electric diagram of an embodiment of an optoelectronic circuit 60. The elements common between optoelectronic circuit 60 and optoelectronic circuit 20 are designated with the same reference numerals. Call $V_{Ci}$ the voltage between the cathode of general light-emitting diode $D_i$ and node $A_2$ and $V_{CS}$ the voltage between nodes $A_3$ and $A_2$. In the following description, unless otherwise mentioned, the voltages are referenced to node $A_2$.

Optoelectronic circuit 60 further comprises N comparison units $COMP_i$, with i varying from 1 to N, capable of each receiving voltage $V_{Ci}$ and of each supplying a signal $H_i$ and a signal $L_i$. Control unit 26 receives signals $L_1$ to $L_N$ and $H_1$ to $H_N$. Control unit 26 preferably corresponds to a dedicated circuit.

Control unit 26 is capable of controlling switches $SW_i$, with i varying from 1 to N, to the on or off state according to the value of voltage $V_{Ci}$ at the cathode of each general light-emitting diode $D_i$. To achieve this, each comparison unit $COMP_i$, with i varying from 1 to N, is capable of comparing voltage $V_{Ci}$ at the cathode of general light-emitting diode $D_i$ with at least two thresholds $Vhigh_i$ and $Vlow_i$. As an example, signal $L_i$ is a binary signal which is in a first state when voltage $V_{Ci}$ is smaller than threshold $Vlow_i$ and which is in a second state when voltage $V_{Ci}$ is greater than threshold $Vlow_i$. As an example, signal $H_i$ is a binary signal which is in a first state when voltage $V_{Ci}$ is smaller than threshold $Vhigh_i$ and which is in a second state when voltage $V_{Ci}$ is greater than threshold $Vhigh_i$. The first states of binary signals $H_i$ and $L_i$ may be the same or different and the second states of binary signals $H_i$ and $L_i$ may be the same or different.

Figure 12:
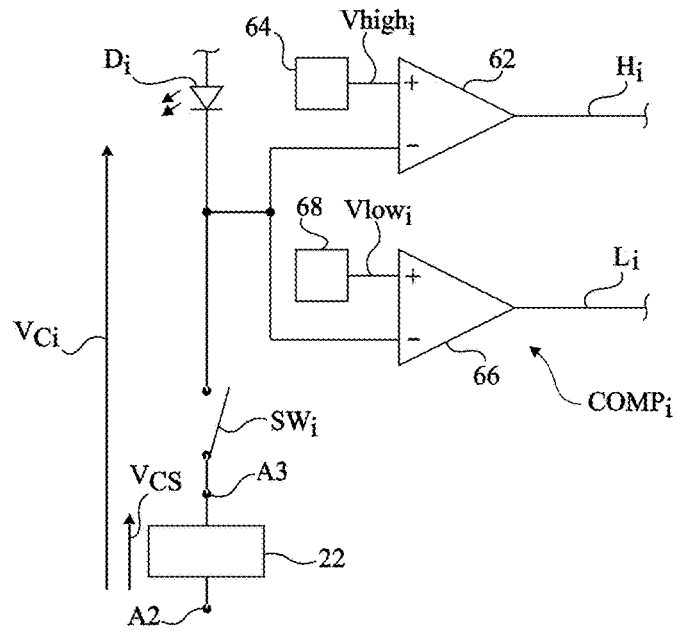
FIG. 12 is an electric diagram of a more detailed embodiment of a portion of the optoelectronic circuit of FIG. 11.

FIG. 12 shows an electric diagram of a more detailed embodiment of a portion of electronic circuit 60. According to the present embodiment, each comparator $COMP_i$ comprises a first operational amplifier 62, operating as a comparator. The inverting input (−) of operational amplifier 62 is connected to the cathode of general light-emitting diode $D_i$, for i varying from 1 to N. The non-inverting input (+) of operational amplifier 62 receives voltage threshold $Vhigh_i$, which is supplied by a unit 64 which may comprise a memory. Operational amplifier 62 supplies signal $H_i$. Each comparator $COMP_i$ further comprises a second operational amplifier 66 operating as a comparator. The inverting input (−) of operational amplifier 66 is connected to the cathode of general light-emitting diode $D_i$, for i varying from 1 to N. The non-inverting input (+) of operational amplifier 66 receives voltage threshold $Vlow_i$, which is supplied by a unit 68 which may comprise a memory. Operational amplifier 66 supplies signal $L_i$.

Figure 13:
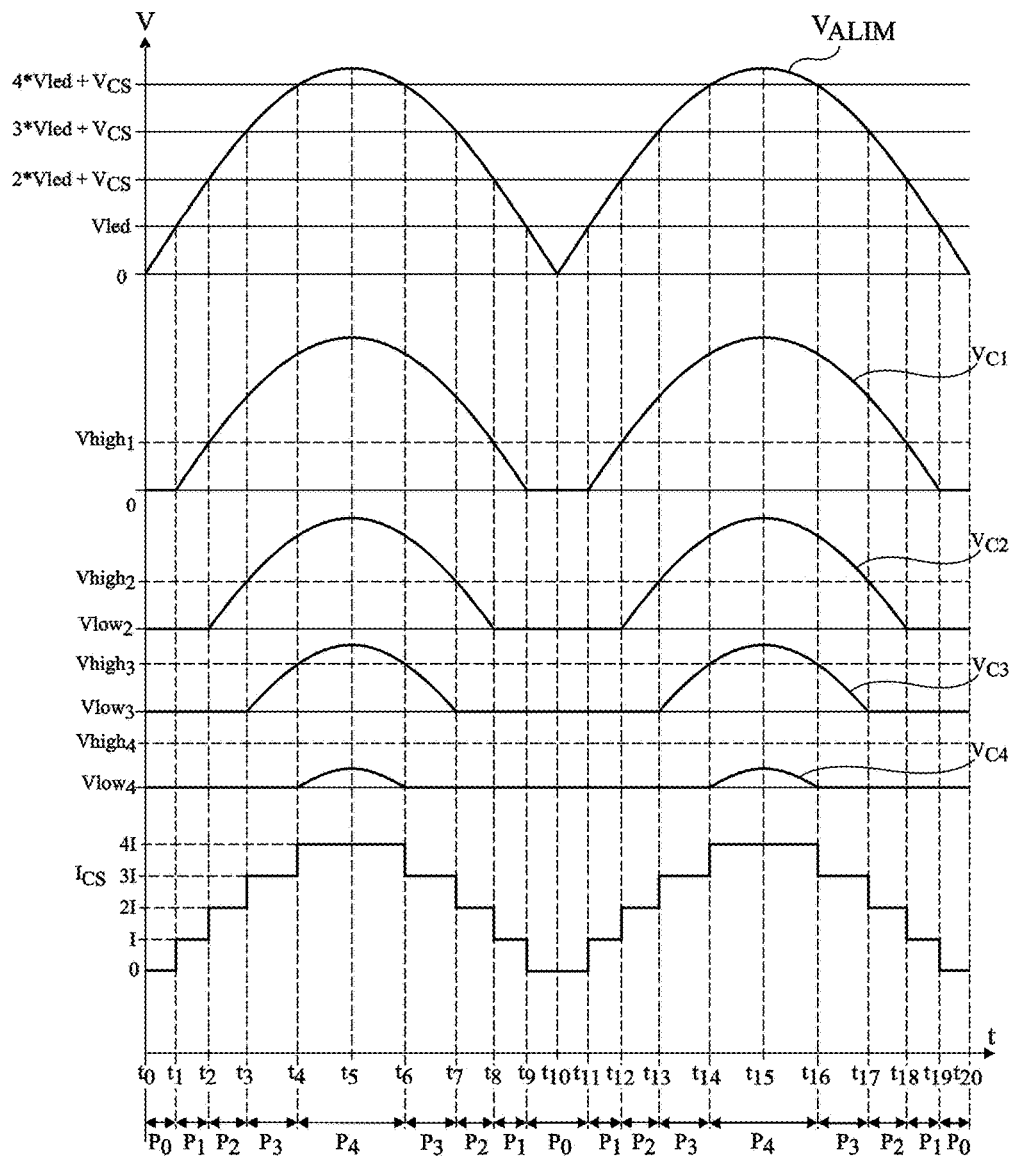
FIG. 13 is a timing diagram of voltages and of the current of the optoelectronic circuit of FIG. 11.

FIG. 13 shows timing diagrams of power supply voltage $V_{ALIM}$ and of the voltages $V_{Ci}$ measured by each comparator $COMP_i$, with i varying from 1 to N, illustrating the operation of optoelectronic circuit 60 according to the embodiment shown in FIG. 11. FIG. 13 corresponds to the case where N and M are equal to 4. Further, each general light-emitting diode $D_i$ comprises the same number of elementary light-emitting diodes arranged in the same configuration, and thus has the same threshold voltage Vled. Further, current source 22 comprises M current sources $CS_j$ in parallel, each current source $CS_j$ being capable, when it is activated, of supplying a constant current of same intensity I. As an example, voltage $V_{ALIM}$ supplied by rectifying bridge 12 is a rectified sinusoidal voltage comprising a succession of cycles, in each of which voltage $V_{ALIM}$ increases from the zero value, crosses a maximum value and decreases to the zero value. As an example, two successive cycles of voltage $V_{ALIM}$ are shown in FIG. 13. Call $t_0$ to $t_{20}$ successive times.

At time $t_0$, at the beginning of a cycle, switch $SW_1$ is turned on and all switches $SW_i$, with i varying from 2 to N, are turned off. Voltage $V_{ALIM}$ rises from the zero value and distributes between general light-emitting diode $D_1$, switch $SW_1$, and current source 22. Voltage $V_{ALIM}$ being smaller than threshold voltage Vled of general light-emitting diode $D_1$, there is no light emission (phase $P_0$) and voltage $V_{C1}$ remains substantially equal to zero. Current $I_{CS}$ is zero.

At time $t_1$, when the voltage across general light-emitting diode $D_1$ exceeds threshold voltage Vled, general light-emitting diode $D_1$ becomes conductive (phase $P_1$). The voltage across general light-emitting diode $D_1$ then remains substantially constant and voltage $V_{C1}$ keeps on increasing along with voltage $V_{ALIM}$. As soon as power supply voltage $V_{C1}$ is sufficiently high to allow the activation of current source 22, current $I_{CS}$, having an intensity equal to I, flows through general light-emitting diode $D_1$, which emits light. As an example, voltage $V_{CS}$ is preferably substantially constant when current source 22 is in operation.

At time $t_2$, when voltage $V_{C1}$ exceeds threshold $Vhigh_1$, unit 26 successively orders the turning on of switch $SW_2$ and the activation of current source $CS_2$, and then the turning off of switch $SW_1$. Voltage $V_{ALIM}$ is then distributed between general light-emitting diodes $D_1$ and $D_2$, switch $SW_2$, and current source 22. Preferably, threshold $Vhigh_1$ is substantially equal to the sum of the threshold voltage of general light-emitting diode $D_2$ and of operating voltage $V_{CS}$ of current source 22 so that, at the turning on of switch $SW_2$, general light-emitting diode $D_2$ conducts current $I_{CS}$ having an intensity equal to 2I and emits light. The fact for switch $SW_2$ to be turned on before the turning off of switch $SW_1$ ensures that there will be no interruption in the current flow through general light-emitting diode $D_1$. Phase $P_2$ corresponds to a phase of light emission by general light-emitting diodes $D_1$ and $D_2$.

Generally, during a rising phase of power supply voltage $V_{ALIM}$, for i varying from 1 to N−1, while switch $SW_i$ is on and the other switches are off, unit 26 successively orders the turning on of switch $SW_{i+1}$, the activation of current source $CS_{i+1}$, and then the turning off of switch $SW_i$ when voltage $V_{Ci}$ exceeds threshold $Vhigh_i$. Voltage $V_{ALIM}$ is then distributed between general light-emitting diodes $D_1$ to $D_{i+1}$, switch $SW_{i+1}$, and current source 22. Preferably, threshold $Vhigh_i$ is substantially equal to the sum of the threshold voltage of general light-emitting diode $D_{i+1}$ and of operating voltage $V_{CS}$ of current source 22 so that, at the turning on of switch $SW_{i+1}$, general light-emitting diode $D_{i+1}$ conducts current $I_{CS}$ having an intensity equal to i+1 times I and emits light. Phase $P_{i+1}$ corresponds to the emission of light by general light-emitting diodes $D_1$ to $D_{i+1}$. The fact for switch $SW_{i+1}$ to be turned on before the turning off of switch $SW_i$ ensures that there will be no interruption in the current flow through general light-emitting diodes $D_1$ to $D_i$.

Thus, at time $t_3$, unit 26 orders the turning on of switch $SW_3$, the activation of current source $CS_3$, and the turning off of switch $SW_2$. Phase $P_3$ corresponds to the emission of light by general light-emitting diodes $D_1$, $D_2$, and $D_3$. At time $t_4$, unit 26 orders the turning on of switch $SW_4$, the activation of current source $CS_4$, and the turning off of switch $SW_3$. Phase $P_4$ corresponds to the emission of light by general light-emitting diodes $D_1$, $D_2$, $D_3$, and $D_4$.

Power supply voltage $V_{ALIM}$ reaches its maximum value at time $t_5$ during phase $P_4$ in FIG. 13 and starts a falling phase.

At time $t_6$, when voltage $V_{C4}$ decreases below threshold $Vlow_4$, unit 26 successively orders the turning on of switch $SW_3$, the deactivation of current source $CS_4$, and the turning off of switch $SW_4$. Voltage $V_{ALIM}$ is then distributed between general light-emitting diodes $D_1$, $D_2$, and $D_3$, switch $SW_3$, and current source 22. General light-emitting diodes $D_1$, $D_2$, and $D_3$ conduct current $I_{CS}$ having an intensity equal to 3I. Preferably, threshold $Vlow_4$ is selected to be substantially equal to the sum of operating voltage $V_{CS}$ of current source 22 and of the minimum operating voltage of switch $SW_4$ so that, at the turning on of switch $SW_3$, there is no interruption in the current flow.

Generally, during a falling phase of power supply voltage $V_{ALIM}$, for i varying from 2 to N, when voltage $V_{Ci}$ decreases below threshold $Vlow_i$, unit 26 successively orders the turning on of switch $SW_{i−1}$, the deactivation of current source $CS_i$, and the turning off of switch $SW_i$. Voltage $V_{ALIM}$ is then distributed between general light-emitting diodes $D_1$ to $D_{i−1}$, switch $SW_{i−1}$, and current source 22. General light-emitting diodes $D_1$ to $D_{i−1}$ conduct current $I_{CS}$ having an intensity equal to i−1 times I. Preferably, threshold $Vlow_i$ is selected to be substantially equal to the sum of operating voltage $V_{CS}$ of current source 22 and of the minimum operating voltage of switch $SW_i$ so that, at the turning on of switch $SW_{i−1}$, there is no interruption in the current flow.

Thus, at time $t_7$, unit 26 orders the turning on of switch $SW_2$, the deactivation of current source $CS_3$, and the turning off of switch $SW_3$. At time $t_8$, unit 26 orders the turning on of switch $SW_1$, the deactivation of current source $CS_2$, and the turning off of switch $SW_2$. At time $t_9$, voltage $V_{C1}$ becomes zero so that general light-emitting diode $D_1$ is no longer conductive and current $I_{CS}$ is zero. At time $t_{10}$, voltage $V_{ALIM}$ becomes zero and a new cycle starts again.

Times $t_{11}$ to $t_{20}$ are respectively similar to times $t_1$ to $t_{10}$. In the present embodiment, comparator $COMP_1$ can have a simpler structure than comparators $COMP_i$, with i varying from 2 to N, since threshold $Vlow_1$ is not used.

According to another embodiment of optoelectronic circuit 60, each comparator $COMP_i$ of optoelectronic circuit 60 only supplies signal $L_i$. An advantage of this embodiment is that the structure of comparator $COMP_i$ can be simplified. Indeed, it is possible for comparator $COMP_i$ not to comprise operational amplifier 62.

The operation of the optoelectronic circuit according to this other embodiment is then identical to what has been previously described, with the difference that switches $SW_i$, with i varying from 1 to N−1, are initially on and that, in a rising phase of power supply voltage $V_{ALIM}$, switch $SW_{i−1}$ is turned off and current source $CS_i$ is activated when voltage $V_{Ci}$ is greater than threshold $Vlow_i$. Indeed, this means that current starts flowing through switch $SW_i$.

More specifically, in a rising phase of power supply voltage $V_{ALIM}$, for i varying from 1 to N−1, while light-emitting diodes $D_1$ to $D_{i−1}$ are conductive and light-emitting diodes $D_i$ and $D_N$ are non-conductive, when voltage $V_{Ci}$ rises above threshold $Vlow_i$, unit 26 orders the turning off of switch $SW_{i−1}$ and the activation of current source $CS_i$. Indeed, a rise in voltage $V_{Ci}$ means that the voltage across light-emitting diode $D_i$ becomes greater than the threshold voltage of light-emitting diode $D_i$ and that the latter becomes conductive.

The operation of the optoelectronic circuit according to this other embodiment in a falling phase of power supply voltage $V_{ALIM}$ may be identical to that which has been previously described for optoelectronic circuit 60.

Figure 14:
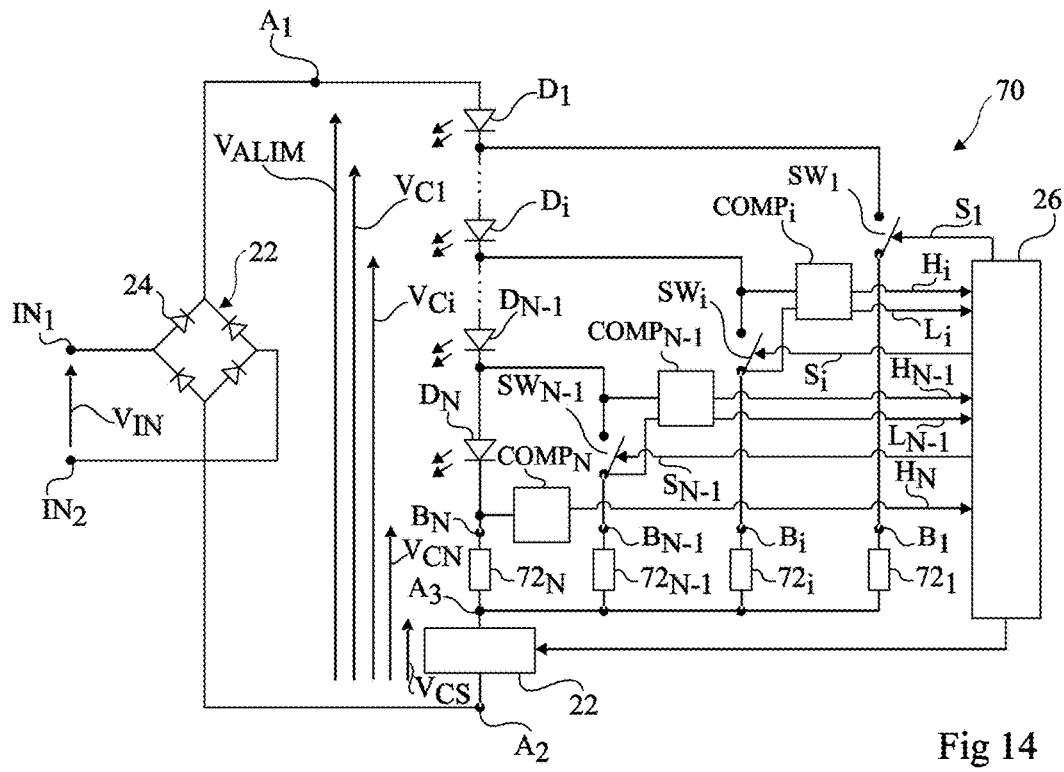
FIG. 14 is an electric diagram of another embodiment of an optoelectronic circuit comprising light-emitting diodes and a device for switching the light-emitting diodes.

FIG. 14 shows an electric diagram of another embodiment of an optoelectronic circuit 70. All the elements common with optoelectronic circuit 60 are designated with the same reference numerals. Conversely to optoelectronic circuit 60, optoelectronic circuit 70 does not comprise switch $SW_N$. Further, conversely to optoelectronic circuit 60, for i varying from 1 to N−1, optoelectronic circuit 70 comprises a resistor $72_i$ provided between node $A_3$ and switch $SW_i$, and optoelectronic circuit 70 comprises a resistor $72_N$ provided between node $A_3$ and the cathode of general light-emitting diode $D_N$. Call $B_i$ a node between resistor $72_i$ and switch $SW_i$, for i varying from 1 to N−1, and $B_N$ a node between resistor $72_N$ and the cathode of general light-emitting diode $D_N$. Further, each comparator $COMP_i$, with i varying from 1 to N, receives the voltage at node $B_i$. Signal $H_i$ then is a binary signal which is in a first state when the voltage at node $B_i$ is smaller than a threshold $MIN_i$ and which is in a second state when the voltage at node $B_i$ is greater than threshold $MIN_i$.

Figure 15:
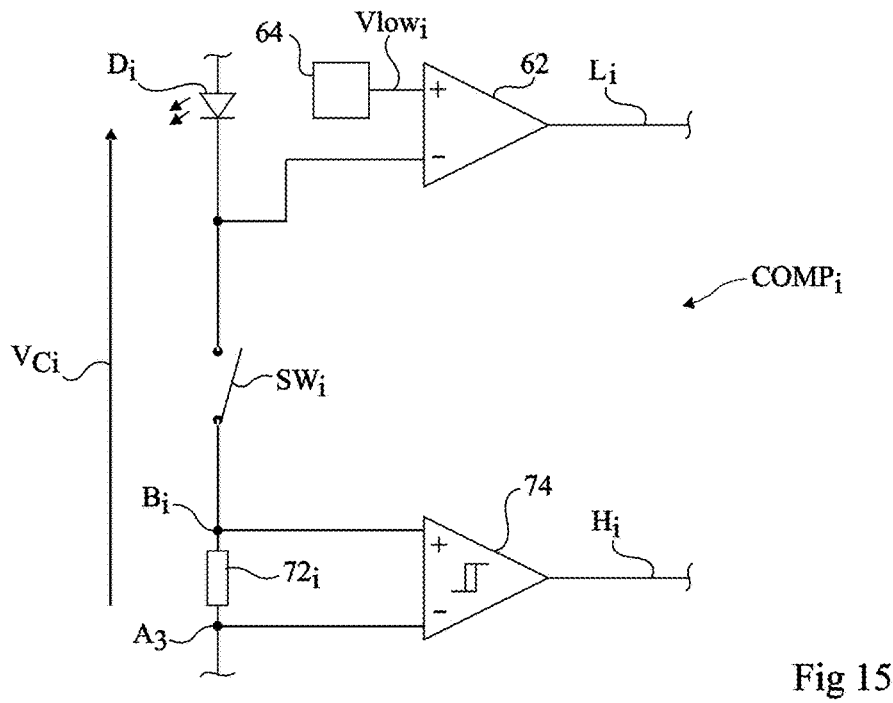
FIG. 15 is an electric diagram of a more detailed embodiment of a portion of the optoelectronic circuit of FIG. 14.

FIG. 15 shows an electric diagram of a more detailed embodiment of a portion of optoelectronic circuit 70. In the present embodiment, comparator $COMP_i$ comprises all the elements of comparator $COMP_i$ shown in FIG. 12, with the difference that operational amplifier 66 is replaced with a hysteresis comparator 74 receiving the voltage across resistor $72_i$ and supplying signal $H_i$.

The operation of optoelectronic circuit 70 may be identical to the operation of previously-described optoelectronic circuit 60, with the difference that, in a rising phase of power supply voltage $V_{ALIM}$, switch $SW_i$ is turned off and current source $CS_{i+1}$ is activated when current starts flowing through resistor $72_{i+1}$.

More specifically, switches $SW_i$, with i varying from 1 to N−1, are initially on. In a rising phase of power supply voltage $V_{ALIM}$, for i varying from 2 to N−1, while light-emitting diodes $D_1$ to $D_{i-1}$ are conductive and light-emitting diodes $D_i$ to $D_N$ are blocked, when the voltage across light-emitting diode $D_i$ becomes greater than the threshold voltage of light-emitting diode $D_i$, the latter becomes conductive and a current starts flowing through resistor $72_i$. This results in a rise in the voltage at node $B_i$. As soon as the voltage at node $B_i$ rises above threshold $MIN_i$, unit 26 orders the turning off of switch $SW_{i-1}$ and the activation of current source $CS_i$.

The operation of optoelectronic circuit 70 in a falling phase of power supply voltage $V_{ALIM}$ may be identical to that which has been previously described for optoelectronic circuit 60.

Optoelectronic circuit 70 has the advantage that thresholds $MIN_i$ and $Vlow_i$ can be independent from the characteristics of light-emitting diodes $D_i$. In particular, they do not depend on the threshold voltage of each light-emitting diode $D_i$.

Figure 16:
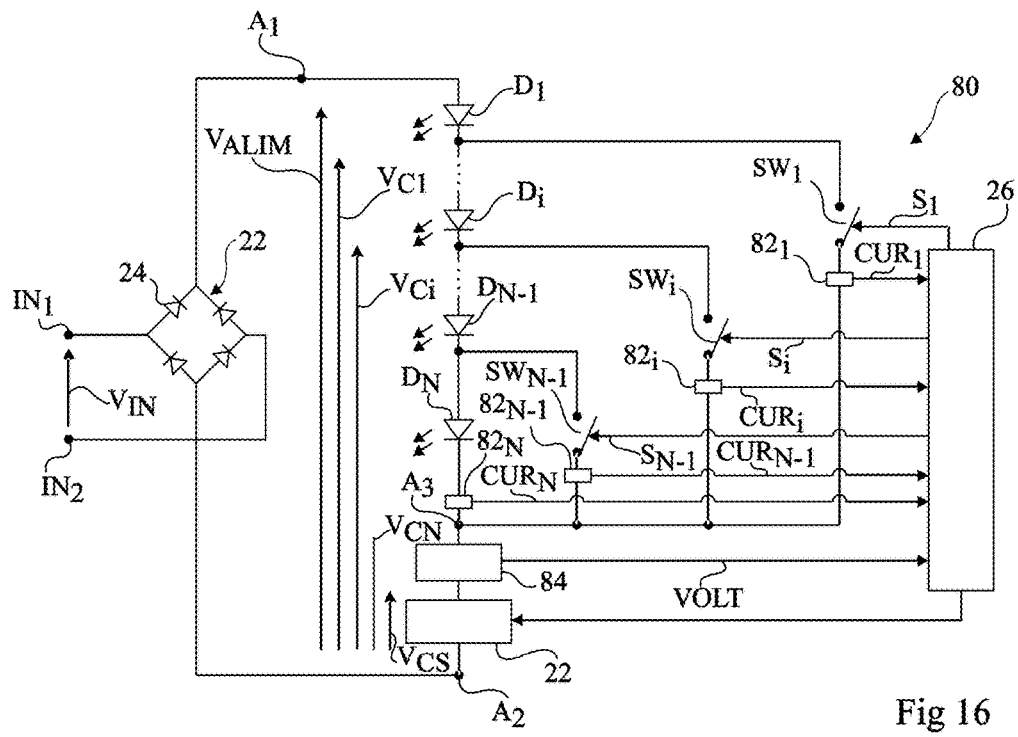
FIG. 16 is an electric diagram of another embodiment of an optoelectronic circuit comprising light-emitting diodes and a device for switching the light-emitting diodes.

FIG. 16 shows an electric diagram of another embodiment of an optoelectronic circuit 80. All the elements common with optoelectronic circuit 60 are designated with the same reference numerals. Conversely to optoelectronic circuit 60, optoelectronic circuit 80 does not comprise comparators $COMP_i$. Further, optoelectronic circuit 80 does not comprise switch $SW_N$. However, switch $SW_N$ may be present. Further, unlike optoelectronic circuit 60, for i varying from 1 to N-1, optoelectronic circuit 80 comprises a current sensor $82_i$ provided between node $A_3$ and switch $SW_i$, supplying a signal $CUR_i$ to control unit 26, and optoelectronic circuit 80 comprises a current sensor $82_N$ provided between node $A_3$ and the cathode of general light-emitting diode $D_N$ and delivering a signal $CUR_N$ to control unit 26. Optoelectronic circuit 80 further comprises a voltage sensor 84 provided between current source 22 and node $A_3$ and delivering a signal VOLT to control unit 26. Current source 22 may be formed according to any of the previously-described embodiments.

According to an embodiment, each current sensor $82_i$ is capable of supplying control unit 26 with a signal $CUR_i$ representative of the intensity of the current flowing through general light-emitting diode $D_i$. According to another embodiment, each current sensor $82_i$ is capable of supplying control unit 26 with a signal $CUR_i$ indicating whether the intensity of the current flowing through general light-emitting diode $D_i$ is greater than a current threshold.

According to an embodiment, voltage sensor 84 is capable of supplying a signal VOLT to control unit 26 representative of voltage $V_{CS}$. According to another embodiment, voltage sensor 84 is capable of transmitting a signal VOLT to control unit 26 indicating whether voltage $V_{CS}$ is greater than a threshold voltage. Voltage sensor 84 may then comprise an operational amplifier assembled as a comparator supplying signal VOLT, having its non-inverting input connected to node $A_3$ and having its inverting input receiving the threshold voltage.

Optoelectronic circuit 80 may operate as follows. At the beginning of a rising phase of voltage $V_{ALIM}$, switches $SW_i$, with i varying from 1 to N-1, are turned on. In a rising phase, for i varying from 2 to N-1, while general light-emitting diodes $D_1$ to $D_{i-1}$ are conductive and general light-emitting diodes $D_i$ to $D_N$ are non-conductive, when the voltage across general light-emitting diode $D_i$ becomes greater than the threshold voltage of general light-emitting diode $D_i$, the latter becomes conductive and a current starts flowing through general light-emitting diode $D_i$. The flowing of the current is detected by current sensor $82_i$. Unit 26 then controls switch $SW_{i-1}$ to the off state.

At the beginning of a falling phase of power supply voltage $V_{ALIM}$, switches $SW_i$, with i varying from 1 to N-1, are turned off and when voltage $V_{CS}$ decreases below a voltage threshold, switch $SW_{N-1}$ is turned on. Generally, in a falling phase, switches $SW_i$ to $SW_{N-1}$ being on while switches $SW_1$ to $SW_{i-1}$ are off, when voltage $V_{CS}$ decreases below a voltage threshold, switch $SW_{i-1}$ is turned on. In the case where each switch $SW_i$ is formed of an N-channel MOS transistor having its drain connected to the cathode of general light-emitting diode $D_i$ and having its source connected to current sensor $82_i$, when power supply voltage $V_{ALIM}$ decreases, the voltage between the drain of switch $SW_i$ and node $A_2$ decreases. Transistor $SW_i$ is initially in saturation state. During the decrease of the voltage between the drain of switch $SW_i$ and node $A_2$, transistor $SW_i$ switches from the saturation state to the linear state. This causes an increase of the voltage between the gate and the source of transistor $SW_i$ and thus a decrease of voltage $V_{CS}$. When voltage $V_{CS}$ decreases below a voltage threshold, switch $SW_{i-1}$ is turned on.

Current source 22 may be controlled according to any of the previously-described embodiments.

Figure 17:
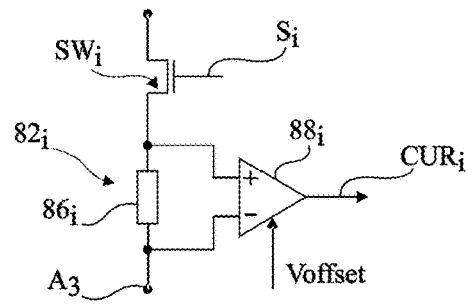
FIGS. 17 and 18 show electric diagrams of embodiments of a current sensor of the electronic circuit of FIG. 16.

FIG. 17 shows an embodiment of current sensor $82_i$ where current sensor $82_i$ comprises a resistor $86_i$ series-assembled between node $A_3$ and switch $SW_i$, shown in FIG. 17 as a MOS transistor, and an operational amplifier $88_i$ assembled as a comparator supplying signal $CUR_i$, having its non-inverting input (+) connected to a terminal of resistor $86_i$ and having its inverting input (-) connected to the other terminal of resistor $86_i$. Amplifier $88_i$ comprises a terminal for setting offset voltage $V_{offset}$ of the amplifier. Amplifier $88_i$ supplies signal $CUR_i$ in a first state when the voltage across resistor $86_i$ is greater than offset voltage $V_{OFFSET}$ and in a second state when the voltage across resistor $86_i$ is smaller than offset voltage $V_{OFFSET}$.

Figure 18:
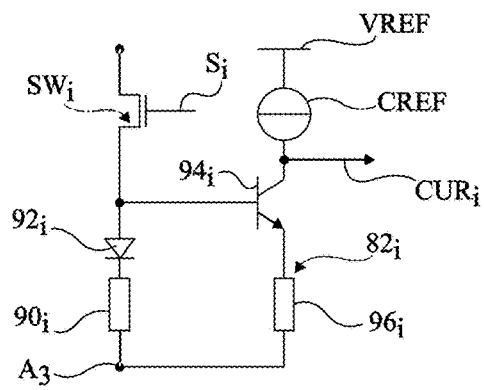

FIG. 18 shows another embodiment of current sensor $82_i$, where current sensor $82_i$ comprises a resistor $90_i$ and a diode $92_i$ series-assembled between node $A_3$ and switch $SW_i$, shown in FIG. 18 by a MOS transistor, the cathode of diode $92_i$ being connected to resistor $90_i$. Current sensor $82_i$ further comprises a bipolar transistor $94_i$ having its base connected to the anode of diode $92_i$, having its collector supplying signal $CUR_i$, and having its emitter connected to node $A_3$ by a resistor $96_i$. The collector of bipolar transistor $94_i$ is connected to a terminal of a source of a reference current CREF having its other terminal connected to a source of a reference voltage VREF.

Advantageously, in the embodiments previously described in relation with FIGS. 16 to 18, the maximum voltages applied to the electronic components, particularly transistors MOS, of current sensors $82_i$ and of current sensor 84 remain small as compared with the maximum value that voltage $V_{ALIM}$ can take. It is then not necessary to provide, for current sensors $82_i$ and current sensor 84, electronic components capable of withstanding the maximum voltage that voltage $V_{ALIM}$ can take.

Figure 19:
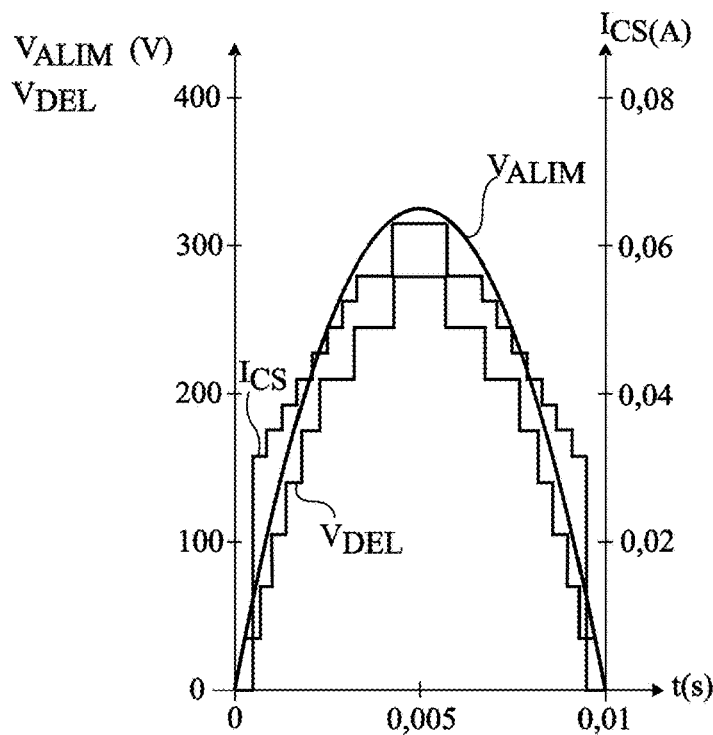
FIGS. 19 and 20 show curves of the variation, obtained by simulation, of voltages and of currents of the optoelectronic circuit of FIG. 3 for two embodiments of control of the current source of the optoelectronic circuit.
Figure 20:
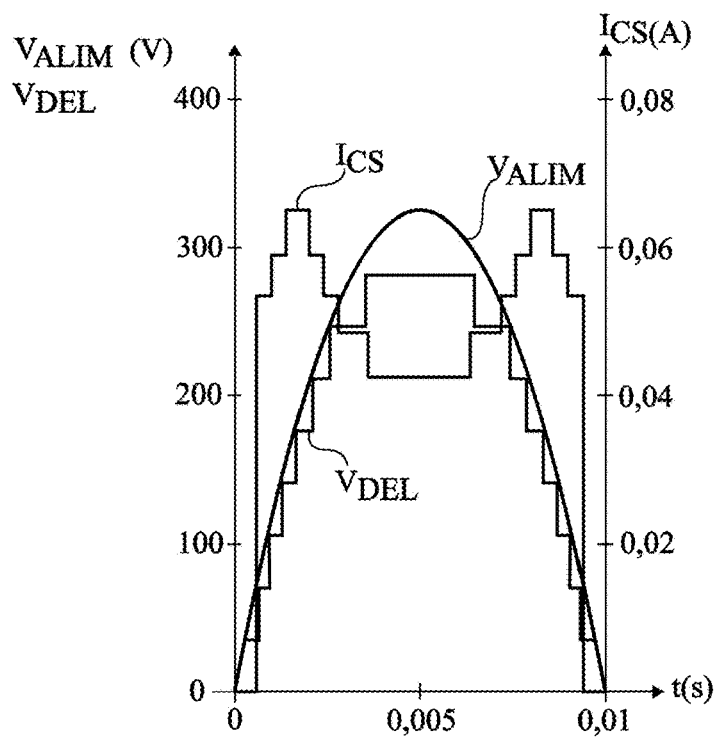

FIGS. 19 and 20 show curves of the variation, obtained by simulation during a cycle of voltage $V_{ALIM}$ in the case where voltage $V_{IN}$ is a sinusoidal voltage, of power supply voltage $V_{ALIM}$, of current $I_{CS}$, and of a voltage $V_{DEL}$ equal to the sum of the voltages across the general light-emitting diodes which are conductive, when optoelectronic circuit 20 comprises eight general light-emitting diodes and eight elementary light-emitting diodes $CS_j$ in parallel. Each elementary current source $CS_j$ is capable of supplying a constant current of same intensity.

Calling $P_{lum}$ the instantaneous light power supplied by the optoelectronic circuit and $P_{lumMOY}$ the average of the light power over a cycle of voltage $V_{ALIM}$, flicker index FI is defined by the following relation (1):

$$FI = \frac{\int_{cycle} (P_{lum}(t) - P_{lumMOY}) \, dt}{\int_{cycle} P_{lum} \, dt} \qquad (1)$$

FIG. 19 has been obtained with a sequence of activation of the elementary current sources of current source 22 similar to what has been previously described in relation with FIG. 5A. The average active power consumed by the optoelectronic circuit is 10.55 W, the power factor is substantially equal to 1 and flicker index IF is substantially equal to 33. Advantageously, the optoelectronic circuit further fulfills the constraints relative to harmonic currents provided for class-D and class-C lighting equipment by standard NF EN 61000-3-2, November 2014 version, regarding electromagnetic compatibility.

FIG. 20 has been obtained for a sequence of activation of the elementary current sources of current source 22 similar to what has been previously described in relation with FIG. 5B. The average active power consumed by the optoelectronic circuit is 10.58 W, the power factor is substantially equal to 0.89, and flicker index IF is substantially equal to 22. The flicker index is decreased with respect to the case illustrated in FIG. 19. The optoelectronic circuit further fulfills the constraints relative to harmonic currents provided for class-D lighting equipment, that is, equipment receiving an active power smaller than 25 W, by standard NF EN 61000-3-2, November 2014 version, regarding electromagnetic compatibility.

Figure 21:
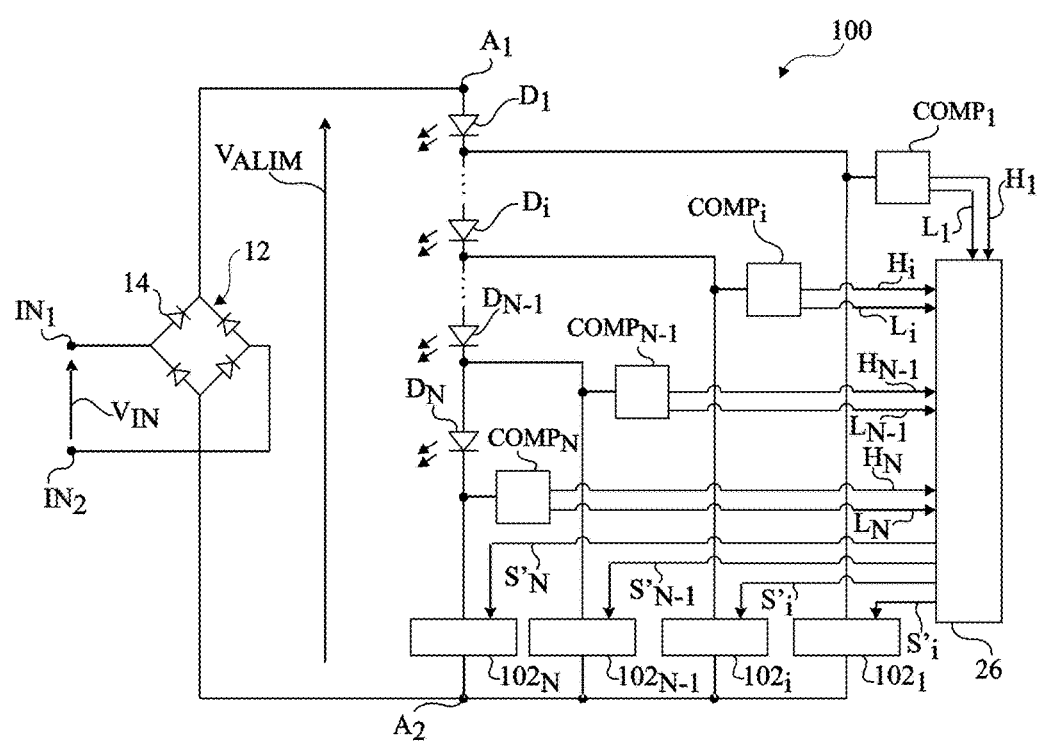
FIG. 21 shows an electric diagram of another embodiment of an optoelectronic circuit comprising light-emitting diodes and a device for switching the light-emitting diodes.

FIG. 21 shows an electric diagram of another embodiment of an optoelectronic circuit 100. All the elements common with optoelectronic circuit 20 are designated with the same reference numerals. Optoelectronic circuit 100 comprises, for each general light-emitting diode $D_i$, a current source $102_i$, with i varying from 1 to N, associated with general light-emitting diode $D_i$. A terminal of current source $102_i$, with i varying from 1 to N, is connected to node $A_2$ and the other terminal is connected to the cathode of general light-emitting diode $D_i$. Each current source $102_i$, with i varying from 1 to N, is controlled by a signal $S'_i$ supplied by control unit 26. As an example, signal $S'_i$ is a binary signal and current source $102_i$ is activated when signal $S'_i$ is in a first state and current source $102_i$ is deactivated when signal $S'_i$ is in a second state. The intensities of the currents supplied by current sources $102_i$ are different. Optoelectronic circuit 100 further comprises N comparison units $COMP_i$, with i varying from 1 to N, capable of each receiving the voltage at the cathode of general light-emitting diode $D_i$ and of each supplying a signal $H_i$ and a signal $L_i$ to control unit 26. Control unit 26 is capable of controlling switches $SW_i$ to the on or off state, with i varying from 1 to N, according to the value of the voltage at the cathode of each general light-emitting diode $D_i$. To achieve this, each comparison unit $COMP_i$, with i varying from 1 to N, is capable of comparing the voltage at the cathode of general light-emitting diode $D_i$ with at least two thresholds $Vhigh_i$ and $Vlow_i$. As an example, signal $L_i$ is a binary signal which is in a first state when voltage $V_{Ci}$ is smaller than threshold $Vlow_i$ and which is in a second state when voltage $V_{Ci}$ is greater than threshold $Vlow_i$. As an example, signal $H_i$ is a binary signal which is in a first state when voltage $V_{Ci}$ is smaller than threshold $Vhigh_i$ and which is in a second state when voltage $V_{Ci}$ is greater than threshold $Vhigh_i$. The first states of binary signals $H_i$ and $L_i$ may be the same or different and the second states of binary signals $H_i$ and $L_i$ may be the same or different.

The operation of optoelectronic circuit 100 may be identical to the operation of previously-described optoelectronic circuit 20, with the difference that the steps of turning off and turning on of switches $SW_i$ of optoelectronic circuit 20 are respectively replaced with steps of activation and of deactivation of current sources $102_i$.

More specifically, in a rising phase of power supply voltage $V_{ALIM}$, for i varying from 1 to N−1, while current source $102_i$ is activated and the other current sources are deactivated, unit 26 successively orders the activation of current source $102_{i+1}$ and the deactivation of current source $102_i$ when voltage $V_{Ci}$ exceeds threshold $Vhigh_i$. Voltage $V_{ALIM}$ is then distributed between general light-emitting diodes $D_1$ to $D_{i+1}$ and current source $102_{i+1}$. Preferably, threshold $Vhigh_i$ is selected to be substantially equal to the threshold voltage of general light-emitting diode $D_{i+1}$ so that, on activation of current source $102_{i+1}$, general light-emitting diode $D_{i+1}$ conducts current $I_{CS}$ and emits light. The fact for current source $102_{i+1}$ to be activated before current source $102_i$ is deactivated ensures that there is no interruption in the current flow through general light-emitting diodes $D_1$ to $D_i$.

Generally, in a falling phase of power supply voltage $V_{ALIM}$, for i varying from 2 to N, when voltage $V_{Ci}$ decreases below threshold $Vlow_i$, unit 26 successively orders the activation of current source $102_{i-1}$ and the deactivation of current source $102_i$. Voltage $V_{ALIM}$ is then distributed between general light-emitting diodes $D_1$ to $D_{i-1}$ and current source $102_{i-1}$. The fact for current source $102_{i-1}$ to be activated before current source $102_i$ is deactivated ensures that there is no interruption in the current flow through general light-emitting diodes $D_1$ to $D_{i-1}$.

Preferably, each current source $102_i$ is capable of supplying a current having an intensity which can be modified so that the variation profile of the intensity of the current flowing through general light-emitting diodes $D_i$ during successive rising and falling phases can be modified.

Various embodiments with various variations have been described hereabove. It should be noted that those skilled in the art may combine these various embodiments and variations without showing any inventive step. In particular, the embodiments of current source 22 previously described in relation with FIGS. 4 and 6 to 10 may be implemented with each of optoelectronic circuits 20, 60, and 70.

The invention claimed is:

1. An optoelectronic circuit intended to receive a variable voltage containing an alternation of rising and falling phases, the optoelectronic circuit comprising:
   a plurality of assemblies of light-emitting diodes;
   a current source configured to supply a current having an intensity depending on at least one control signal, the current source comprising elementary current sources assembled in parallel and configured to be activated and deactivated independently from one another; and
   a switching device configured to control said current through each assembly of the assemblies of light-emitting diodes, and configured to supply said at least one control signal to vary the intensity of said current according to the number of assemblies conducting said current during at least a rising or falling phase.

2. The optoelectronic circuit of claim 1, wherein the current source is configured to supply a current having its intensity varying among a plurality of different intensity values according to the number of assemblies conducting said current during at least one rising or falling phase.

3. The optoelectronic circuit of claim 1, wherein the elementary current sources are configured to supply currents having the same intensity or different intensities.

4. The optoelectronic circuit of claim 1, wherein the switching device is configured to activate at least one of the elementary current sources during at least one rising phase and is configured to deactivate at least one of the elementary current sources during at least one falling phase.

5. The optoelectronic circuit of claim 1, wherein one of the elementary current sources is configured to supply a current having a given intensity and the other elementary current sources are each configured to supply a current having an intensity equal to a power of two different from said given intensity.

6. The optoelectronic circuit of claim 1, wherein the switching device is configured to connect the assemblies of light-emitting diodes according to a plurality of connection configurations successively according to a first order during each rising phase of the variable voltage and a second order during each falling phase of the variable voltage and is configured to activate the elementary current sources according to a third order during each rising phase of the variable voltage and of deactivating the elementary current sources according to a fourth order during each falling phase of the variable voltage.

7. The optoelectronic circuit of claim 1, comprising a memory having a plurality of values of the control signal of the current source, each corresponding to the provision by the current source of said current having its intensity varying among said plurality of intensity values, stored therein.

8. The optoelectronic circuit of claim 1, comprises means for modifying the variation profile of the intensity of said current according to the number of assemblies conducting said current during at least one rising or falling phase.

9. The optoelectronic circuit of claim 1, wherein the assemblies of light-emitting diodes are series-connected and wherein the switching device comprises, for each assembly of light-emitting diodes, at least one switch connecting said assembly to the current source, the switching device being configured to transmit binary control signals for the turning off or on of the switches according to said connection configurations.

10. The optoelectronic circuit of claim 1, wherein the switching device is configured to control said current at least in part through interrupting flow of the current.

11. A method of controlling a plurality of assemblies of light-emitting diodes of an optoelectronic circuit receiving a variable voltage containing an alternation of rising and falling phases, the optoelectronic circuit further comprising a current source supplying a current having its intensity depending on at least one control signal and a switching device, wherein, during at least one rising or falling phase, the switching device orders or interrupts the flowing of said current through each assembly and supplies said at least one control signal to vary the intensity of said current according to the number of assemblies conducting said current, wherein the current source comprises elementary current sources assembled in parallel and capable of being activated and deactivated independently from one another.

12. The method of claim 11, wherein the current source supplies said current having its intensity varying among a plurality of different intensity values according to the number of assemblies conducting said current during at least one rising or falling phase.

13. The method of claim 11, wherein the current source comprises at least two elementary current sources assembled in parallel and wherein at least one of the elementary current sources is activated during at least one rising phase and at least one of the elementary current sources is deactivated during at least one falling phase.

14. The method of claim 13, wherein the current source comprises at least three elementary current sources assembled in parallel, wherein, for at least successive rising and falling phases, the number of activated elementary current sources increases from the beginning to the end of the rising phase and the number of activated elementary current sources decreases from the beginning to the end of the falling phase or wherein the number of activated elementary current sources increases and then decreases from the beginning to the end of the rising phase and the number of activated elementary current sources increases and then decreases from the beginning to the end of the falling phase.

* * * * *